United States Patent [19]

Wakabayashi et al.

[11] Patent Number: 5,018,597
[45] Date of Patent: May 28, 1991

[54] FREE WHEEL HUB CONTROL SYSTEM

[75] Inventors: Hideaki Wakabayashi, Nagoya; Tooru Kagata, Toyota; Hiroyuki Amano, Kariyo, all of Japan

[73] Assignee: Aisin Seiki Kabushiki Kaisha, Kariya, Japan

[21] Appl. No.: 457,385

[22] Filed: Dec. 27, 1989

[30] Foreign Application Priority Data

Dec. 28, 1988 [JP] Japan .............. 63-328990

[51] Int. Cl.⁵ .............................. B60K 23/08
[52] U.S. Cl. ...................... 180/247; 192/84 R; 403/1
[58] Field of Search ............ 180/247; 403/1; 192/2 R, 84 R; 361/398

[56] References Cited

U.S. PATENT DOCUMENTS

| | | | |
|---|---|---|---|
| 4,399,488 | 8/1983 | Ruwe et al. | 361/398 |
| 4,833,568 | 5/1989 | Berhold | 361/398 |
| 4,899,856 | 2/1990 | Kurihara | 192/2 R |
| 4,928,804 | 5/1990 | Wakabayashi | 180/247 |

FOREIGN PATENT DOCUMENTS

| | | | |
|---|---|---|---|
| 0060735 | 5/1980 | Japan | 192/84 R |
| 0012336 | 1/1985 | Japan | 180/247 |
| 0078929 | 3/1989 | Japan | 180/247 |
| 0090823 | 4/1989 | Japan | 180/247 |

Primary Examiner—Charles A. Marmor
Assistant Examiner—Mitchell Bompey
Attorney, Agent, or Firm—Burns, Doane, Swecker & Mathis

[57] ABSTRACT

A free wheel hub control system for a free wheel hub mechanism is positioned between a drive shaft and an axle hub supported by a spindle. A flexible printed circuit is disposed between an inner face of the spindle and an outer face of the drive shaft to transmit a control signal to an electric element of the free wheel hub mechanism. A cylindrical collar having contact portions is tightly fitted to the inner face of the spindle to hold the printed circuit in position.

6 Claims, 4 Drawing Sheets

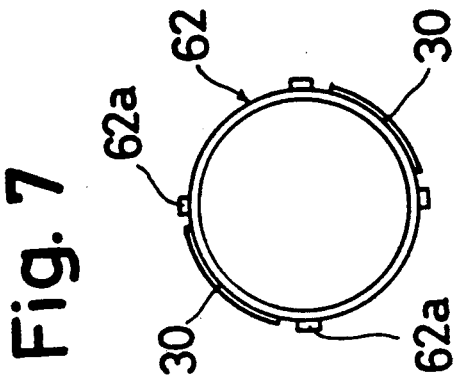
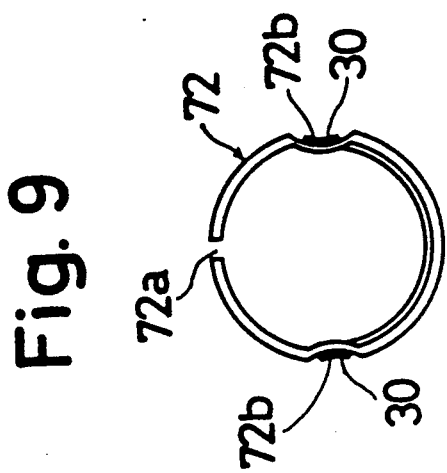
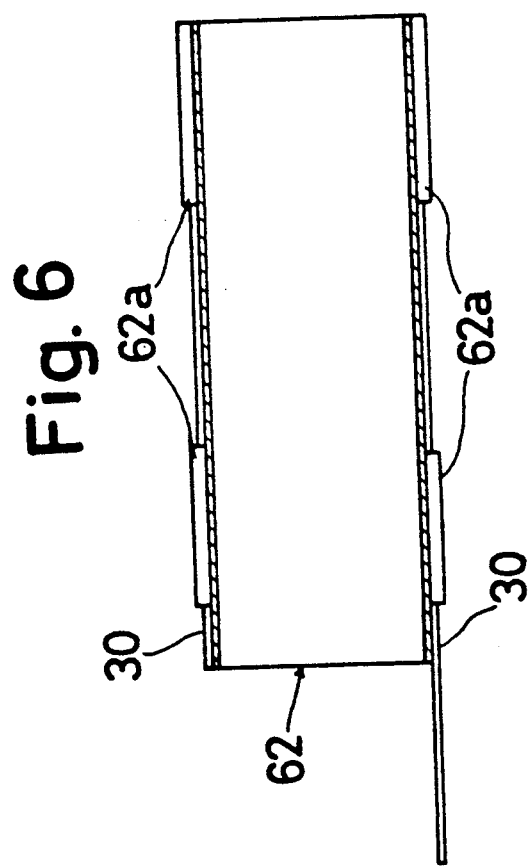
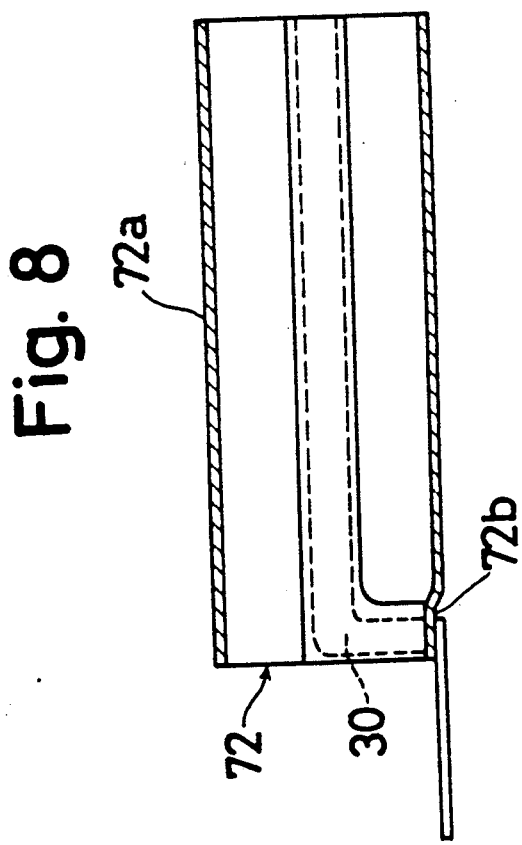

5,018,597

FREE WHEEL HUB CONTROL SYSTEM

BACKGROUND OF THE INVENTION

1. Field of the Invention

The invention relates to a free wheel hub for a four wheel drive automobile, and in particular the electrical connections from the battery to an actuator and a sensor positioned in the free wheel hub mechanism.

2. Description of the Related Art

A free wheel hub system for a four wheel drive automobile is known which includes a sensor indicating the operating condition of the free wheel hub to the driver when the free wheel hub operates automatically in the four wheel driving condition, or indicates actuation of an electric motor which changes the four wheel driving condition to the two wheel driving condition in the axle hub or vice versa.

The prior art shown in FIG. 10 shows a free wheel hub system equipped by a switch sensor 2 so as to indicate the operating condition of the free wheel hub to the driver. When the free wheel hub system changes to the four wheel driving condition, The four wheel drive is actuated by the operation of a hub ring 5 rotating with a drive shaft 3 and an inner hub 4, and roller cage 7 rotates to the left with a roller 6 and contacts a movable part 2a of the switch sensor 2 fixed on the outer side of a spindle 1. The roller 6 engages a clutch housing 8 and the inner hub 4. Thereby, the switch sensor 2 is switched to the ON position and the transmission of a driving force from the drive shaft 3 to the wheel is indicated. An indicator (not shown in FIG. 10) mounted in a dashboard is connected to the switch sensor 2 through electrical wiring 9 which is wired through an opening 1A formed in the spindle 1, or as shown in FIG. 11, along a groove 1B formed on the inner face of the spindle 1.

The foregoing free wheel hub system has a drawback in that the spindle 1 has a reduced load, caused by the forming of the opening 1A or the groove 1B. Therefore, the transferable torque load of such a free wheel hub system is limited. Further, it is not possible to design the opening 1A or the groove 1B to an increased extent, therefore, the diameter of the electrical wiring 9 is limited. The wiring 9 can be broken during assembly or by the vibrations received from the wheel, thereby making the free wheel hub system unreliable. Further, a great deal of care is needed to mount the drive shaft 3 to the spindle 1 without breaking the wiring 9 which leads to extended assembly time.

SUMMARY OF THE INVENTION

It is an object of the invention to provide a free wheel hub system to obviate the above mentioned drawbacks of a known system. In order to accomplish the object, a free wheel hub system is provided with a free wheel hub mechanism disposed between a drive shaft and an axle hub supported by a spindle. Flexible printed circuits are disposed between the inner face of the spindle and the outer face of the drive shaft to control an electrical element of the free wheel hub mechanism. A cylindrical collar having contact parts or portions fits tightly to the inner face of the spindle and the flexible printed circuits are fixedly attached to the outer face.

BRIEF DESCRIPTION OF THE DRAWINGS

FIG. 6 shows a sectional view of a third embodiment of a collar having flexible printed circuits according to the invention;

FIG. 7 shows a front view of a collar with the circuits of FIG. 6;

FIG. 8 shows a sectional view of a fourth embodiment of a collar having flexible printed circuits according to the invention;

FIG. 9 shows a front view of a collar with the circuits of FIG. 8;

DETAILED DESCRIPTION OF A PREFERRED EMBODIMENT OF THE INVENTION

Figure 1:
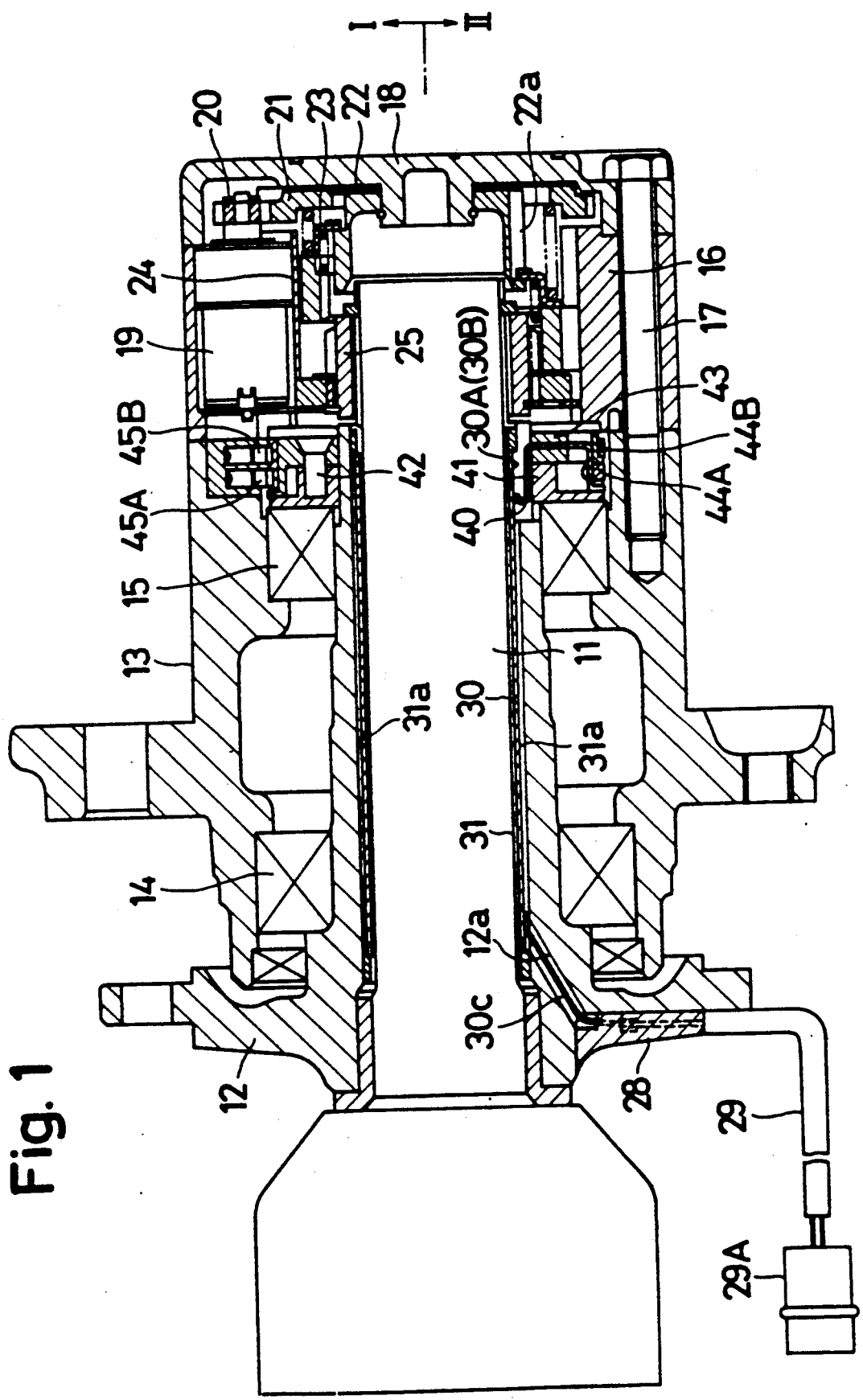
FIG. 1 shows a sectional view of a free wheel hub system of this invention.

In a preferred embodiment of the free wheel hub system shown in FIG. 1, a spindle 12 is mounted on a drive shaft 11 so as to rotate simultaneously therewith. An axle hub 13 is mounted on the spindle 12 through bearings 14 and 15. A hub body 16 and a hub cover 18 are fixedly connected to the axle hub 13 by a bolt 17 and an electric motor 19 is mounted in the hub body 16. Between the drive shaft 11 and the axle hub 13, a free wheel hub mechanism is positioned and includes a motor gear 20, a handle gear 21, a handle 22, a cam follower 23, an outer clutch member 24 and an inner clutch member 25. By the rotation of the electric motor, the motor gear 20 rotates the handle gear 21 on the handle 22 and the cam follower 23 moves to the left side shown in FIG. 1 along a cam face 22a formed on the outer face of the handle 22 engaging with the cam follower 23. The cam follower 23 causes the outer clutch 24 to engage with the inner clutch 25 which rotates with the drive shaft 11. Thereby, the rotating torque of the drive shaft 11 is transmitted to the axle hub 13 and the four wheel driving condition is accomplished.

Figure 2:
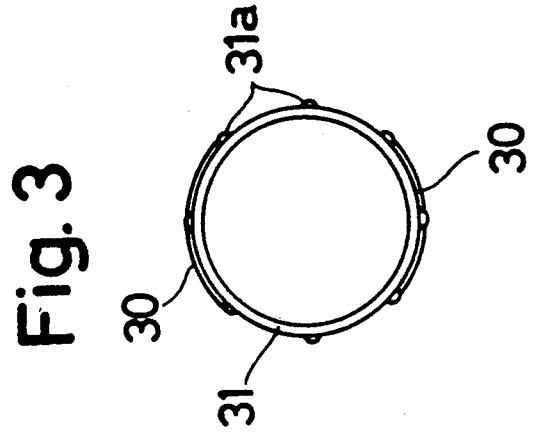
FIG. 2 shows a sectional view of a first embodiment of a collar having flexible printed circuits according to the invention.
Figure 3:
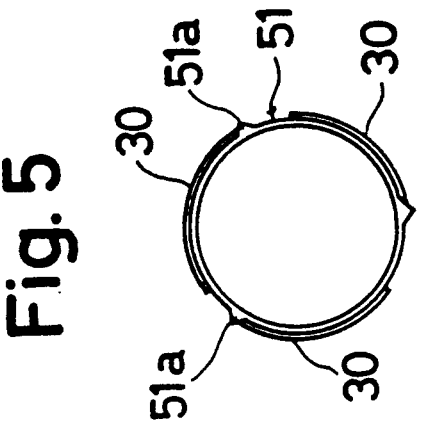
FIG. 3 shows a front view of a collar with the circuits of FIG. 2.

Electric current from the battery to the electric motor 19 flows through a flexible printed circuit 30 which is positioned between the inner face of the spindle 12 and the outer face of the drive shaft 11. The flexible printed circuits 30 are fixed to the outer face of a cylindrical collar 31 by adhesive or welding in FIGS. 2 and 3. The collar 31 is disposed between the drive shaft 11 and the spindle 12. Projections 31a dot the outer face of the collar 31. The flexible printed circuits 30 are fixed between the projections 31a along the axial length of the collar 31. The end of the projections project radially outwardly from the outer face of the collar 31. The collar 31 with the flexible printed circuit 30 is inserted along the inner side of the spindle 12 and is fixedly connected to the spindle 12 because the projections 31a are tightly fitted to the inner face of the spindle 12. Each of terminals 30a, 30b contacts each of the leaf springs 40 which are held by the plastic lock-plate 43 fixed by screws 42 to a lock-nut 41 rotatable with the spindle 12. Each of the outer ends of the terminals 30A, 30B is connected to each of the slip-rings 44A, 44B on the outer face of the lock-plate 43. Each of the brushes 45A and 45B, connected to the terminals of the electric motor 19, contacts each of the slip-rings 44A, 44B.

The connector 29A is linked or connected to the battery. The current flows through the cable 29 to the electric motor 19 through the wire 30C, the flexible printed circuit 30, the terminals 30A, 30B, the leaf springs 40, the slip-rings 44A, 44B and the brushes 45A, 45B. Thereby, the motor 19 is energized and changes the two wheel driving condition to the four wheel driving condition or vice versa.

In FIG. 1, the upper part I shows the two wheel driving condition, in which the outer clutch 24 does not engage the inner clutch 25, and the lower part II shows the four wheel driving condition, in which the outer clutch 24 engages the inner clutch 25.

Figure 4:
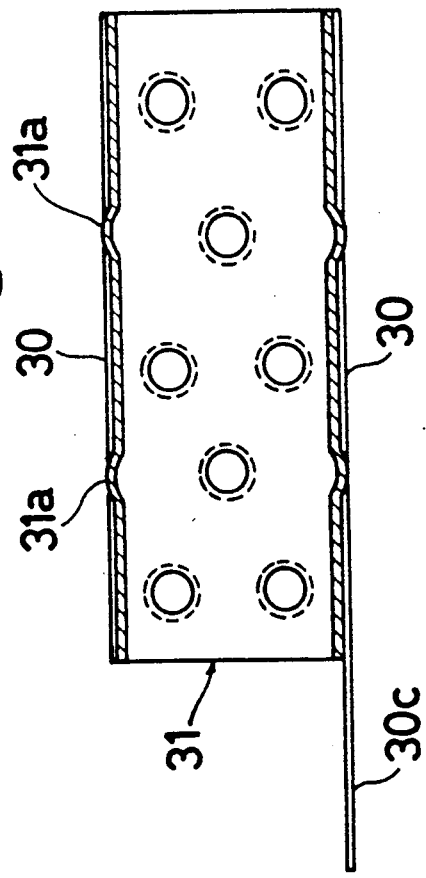
FIG. 4 shows a sectional view of a second embodiment of a collar having flexible printed circuits according to the invention.
Figure 5:
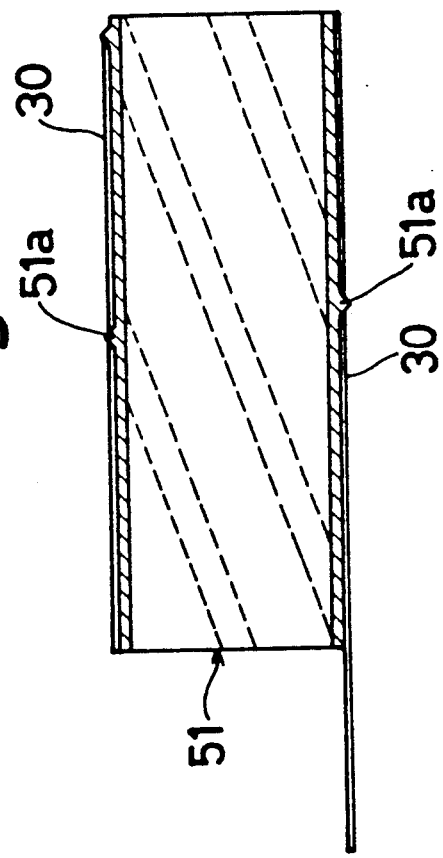
FIG. 5 shows a front view of a collar with the circuits of FIG. 4.

In an embodiment, a collar 51 with the flexible printed circuit 30 in FIGS. 4 and 5, is provided in the form of spiral projections 51a formed on the face of the collar 51. The flexible printed circuit 30 is fixed to the face between the projections 51a by adhesive or welding as shown at 51b.

In a further embodiment, a collar 62 for the flexible printed circuits 30 in FIGS. 6 and 7, is provided with projections 62a made from metal, plastics or rubber, etc. are fixed to the face of the collar 62 and the flexible printed circuit 30 is fixed to the face between the projections 62a by adhesive or welding, shown at 62b.

In an additional embodiment for a collar 72 provided with the flexible printed circuit 30 in FIGS. 8 and 9, the collar 72 has an axial groove 72a and axial recesses 72b, and the flexible printed circuits 30 are fixed to or otherwise received in the recesses 72b. The collar 72 is inserted on the spindle 12 so that the circumferential width of the groove 72a is reduced. The collar 72 is then fixedly connected to the inner face of the spindle by the frictional fit.

Figure 10:
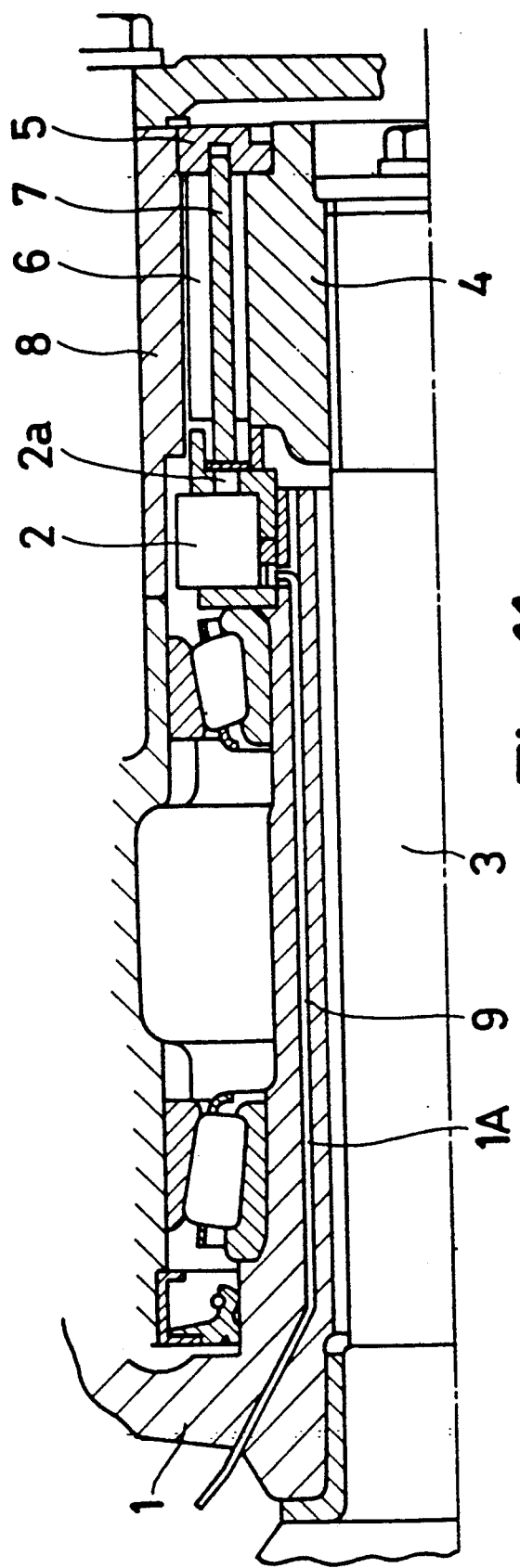
FIG. 10 shows a sectional view of a free wheel hub system of the prior art.
Figure 11:
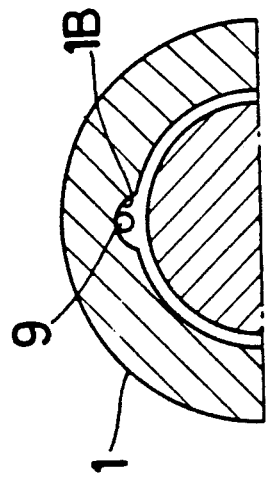
FIG. 11 shows a front sectional view of a free wheel hub system of the prior art.

It is possible to use the sensor 2, shown in FIG. 10, in place of the electric motor 19. It is also possible to secure the flexible printed circuit on the outer face of the drive shaft.

If the flexible printed circuit is mounted between the drive shaft and the spindle in the foregoing manner, it is not necessary to form a hole or a groove axially for the electrical lead. Therefore, the strength of the spindle is not reduced and the free wheel hub system is easy to assemble. Further, the wire can't be broken and the reliability of the system is increased. The addition of terminals or connectors is easy, because the terminals or the connectors can be located at all places along the circumference of the flexible printed circuit.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A free wheel hub control system comprising:
 a free wheel hub mechanism disposed between a drive shaft and an axle hub, the axle hub being rotatably supported by a spindle, a flexible printed circuit disposed between a radial inner face of said spindle and a radial outer face of said drive shaft to transmit a control signal to an electric element of said free wheel hub mechanism, and a cylindrical collar on which is disposed said printed circuits, said cylindrical collar including means for frictionally engaging the cylindrical collar against said inner face of said spindle to connect the cylindrical collar to the spindle.

2. A free wheel hub system according to claim 1 wherein:
 said flexible printed circuit is fixed to the outer face of said collar by adhesive or welding.

3. A free wheel hub system according to claim 2 wherein:
 said means for frictionally engaging includes dot projections which extend outwardly from an outer surface of the cylindrical collar.

4. A free wheel hub system according to claim 2 wherein:
 said means for frictionally engaging includes spiral projections which extend outwardly from an outer surface of the cylindrical collar.

5. A free wheel hub system according to claim 2 wherein:
 said means for frictionally engaging is made of at least one of metal, plastics or rubber.

6. A free wheel hub system according to claim 2 wherein:
 said means for frictionally engaging includes an axial groove extending through the cylindrical collar and axial recesses formed in an outer surface of the cylindrical collar.

* * * * *